(12) United States Patent
Liao

(10) Patent No.: US 8,263,209 B2
(45) Date of Patent: Sep. 11, 2012

(54) PACKAGING CORRUGATED BOARD HAVING PERIPHERAL EDGES OBLIQUE TO FLUTE DIRECTION THEREOF

(75) Inventor: Chih-Yuan Liao, Taipei (TW)

(73) Assignee: Elitegroup Computer Systems Co., Ltd., Neihu District, Taipei (TW)

( * ) Notice: Subject to any disclaimer, the term of this patent is extended or adjusted under 35 U.S.C. 154(b) by 0 days.

(21) Appl. No.: 13/039,128

(22) Filed: Mar. 2, 2011

(65) Prior Publication Data
US 2012/0189812 A1 Jul. 26, 2012

(30) Foreign Application Priority Data
Jan. 21, 2011 (TW) .................................. 100201413

(51) Int. Cl.
*B32B 3/28* (2006.01)
*B32B 3/30* (2006.01)
*B65D 5/00* (2006.01)

(52) U.S. Cl. ........ 428/156; 428/181; 428/182; 428/186; 229/149; 229/939

(58) Field of Classification Search .................. 428/181, 428/182, 184, 185, 186; 229/126, 127, 148, 229/149, 939
See application file for complete search history.

(56) References Cited

U.S. PATENT DOCUMENTS
5,750,235 A * 5/1998 Yoshimasa .................... 428/182
* cited by examiner

*Primary Examiner* — Catherine A Simone
(74) *Attorney, Agent, or Firm* — Winston Hsu; Scott Margo

(57) ABSTRACT

A packaging corrugated board having peripheral edges oblique to flute direction thereof is disclosed. A board body of the packaging corrugated board is formed of a first liner board, a second liner board, and a fluted medium sandwiched between the first and the second liner board. The fluted medium is a corrugated board having a plurality of flutes, and a direction in which the flutes extend is defined as a flute direction. The board body defines a plurality of peripheral edges, and most of the peripheral edges are neither parallel nor perpendicular to the flute direction.

10 Claims, 8 Drawing Sheets

PACKAGING CORRUGATED BOARD HAVING PERIPHERAL EDGES OBLIQUE TO FLUTE DIRECTION THEREOF

FIELD OF THE INVENTION

The present invention relates to a packaging corrugated board, and more particularly to a packaging corrugated board that is cut at 45 degrees so as to have peripheral edges oblique to a flute direction thereof and therefore has increased structural strength.

BACKGROUND OF THE INVENTION

With the increasing awareness of environmental protection and the competition in the market, the research and development of environment-friendly packaging materials has received people's wide concern. In recent years, the traditional wooden cases or plastic boxes used in the packing and transporting of large quantity of goods and merchandise have been gradually replaced by cartons made of cost-effective corrugated board. This is because the wooden cases are expensive and heavy while the plastic boxes have the problems of environmental protection and disposal.

The corrugated board is manufactured by bonding face plies and lining plies to a corrugated inner medium having a plurality of parallel flutes, and has the advantages of high rigidity, high structural strength, low weight, low cost, easy to print, and so on. Meanwhile, the corrugated board has good compression strength and provides excellent buffering effect. With these advantages, the corrugated board has become a packing material widely applied in the packing and packaging industry.

Currently, the corrugated board for making packages or cartons is first cut into a designed pattern. In the past, the corrugated board is always cut in a direction parallel or perpendicular to a flute direction 103 of the corrugated board. Please refer to FIG. 1, which is a plan view showing a packaging corrugated board 100 cut in a conventional manner. After being cut into a desired pattern, the packaging corrugated board 100 has a main edge 102 parallel to a main score line 101, and an angle contained between the main edge 102 and the flute direction 103 is 90 degrees. Two insertion boards 104 designed corresponding to the pattern of the packaging corrugated board 100 also have edges in parallel with or perpendicular to the flute direction 103. That is, an angle contained between the flute direction 103 and the edges of the insertion boards 104 is 90 degrees or 180 degrees. The edges of the face plies or lining plies of the packaging corrugated board 100 cut in the above manner, when being parallel to the flute direction 103, tend to quickly become damaged and separated from the corrugated medium, particularly when the packaging corrugated board has been used for a period of time. The edges of the insertion boards 104 in parallel with the flute direction 103 are particularly easily subjected to such damage when the insertion boards 104 are repeatedly detachably inserted into slots 105 correspondingly provided on the packaging corrugated board, as shown in FIG. 2.

It is therefore tried by the inventor to develop an improved packaging corrugated board that is cut at 45 degrees relative to the flute direction thereof, so that the peripheral edges of the cut packaging corrugated board are oblique to the flute direction, i.e. without being parallel or perpendicular to the flute direction, and the packaging corrugated board can have strengthened structure to avoid easily separated and damaged peripheral edges.

SUMMARY OF THE INVENTION

A primary object of the present invention is to provide a packaging corrugated board having peripheral edges oblique to a flute direction thereof, so as to improve the conventional packaging corrugated board that has peripheral edges parallel or perpendicular to the flute direction and therefore has liner boards that are easily separable from the fluted medium.

To achieve the above and other objects, the packaging corrugated board according to the present invention has a board body formed of a first liner board, a second liner board, and a fluted medium sandwiched between the first and the second liner board. The fluted medium is a corrugated board including a plurality of flutes, and a direction in which the flutes extend is defined as a flute direction. The board body defines a plurality of peripheral edges, and most of the peripheral edges are neither parallel nor perpendicular to the flute direction. A total length of the peripheral edges that are neither parallel nor perpendicular to the flute direction is larger than that of the peripheral edges that are parallel or perpendicular to the flute direction.

In the present invention, a total number of the peripheral edges being neither parallel nor perpendicular to the flute direction is much larger than that of the peripheral edges being parallel or perpendicular to the flute direction.

In a preferred embodiment of the present invention, all the peripheral edges of the board body are neither parallel nor perpendicular to the flute direction.

In the above preferred embodiment, an angle contained between the flute direction and the peripheral edges is 45 degrees.

In a preferred embodiment of the present invention, an angle contained between the flute direction and the peripheral edges that are neither parallel nor perpendicular to the flute direction is ranged between 15 and 75 degrees.

In the above preferred embodiment, the angle contained between the flute direction and the peripheral edges that are neither parallel nor perpendicular to the flute direction is preferably ranged between 25 and 65 degrees.

In the above preferred embodiment, the angle contained between the flute direction and the peripheral edges that are neither parallel nor perpendicular to the flute direction is more preferably ranged between 35 and 55 degrees.

In the above preferred embodiment, the angle contained between the flute direction and the peripheral edges that are neither parallel nor perpendicular to the flute direction is most preferably 45 degrees.

According to the present invention, the board body further includes a plurality of insertion boards, and the insertion boards also having peripheral edges that are neither parallel nor perpendicular to the flute direction.

According to the present invention, the board body further includes a plurality of score lines, and one of the score lines that has a length, width or height larger than that of any other score lines is defined as a main score line; and any one of the peripheral edges of the board body that is parallel to the main score line is neither parallel nor perpendicular to the flute direction.

According to the present invention, the flutes have a cross sectional shape selected from the group consisting of a sine-wave shape, a square-wave shape, and a triangle-wave shape.

With the present invention, a packaging corrugated board is cut at an angle oblique to the flute direction thereof, so that the peripheral edges of the cut packaging corrugated board are neither parallel nor perpendicular to the flute direction. By cutting in this manner, the cut packaging corrugated board can have a strengthened structure and is durable for use over a long time without easily separated and damaged liner boards.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
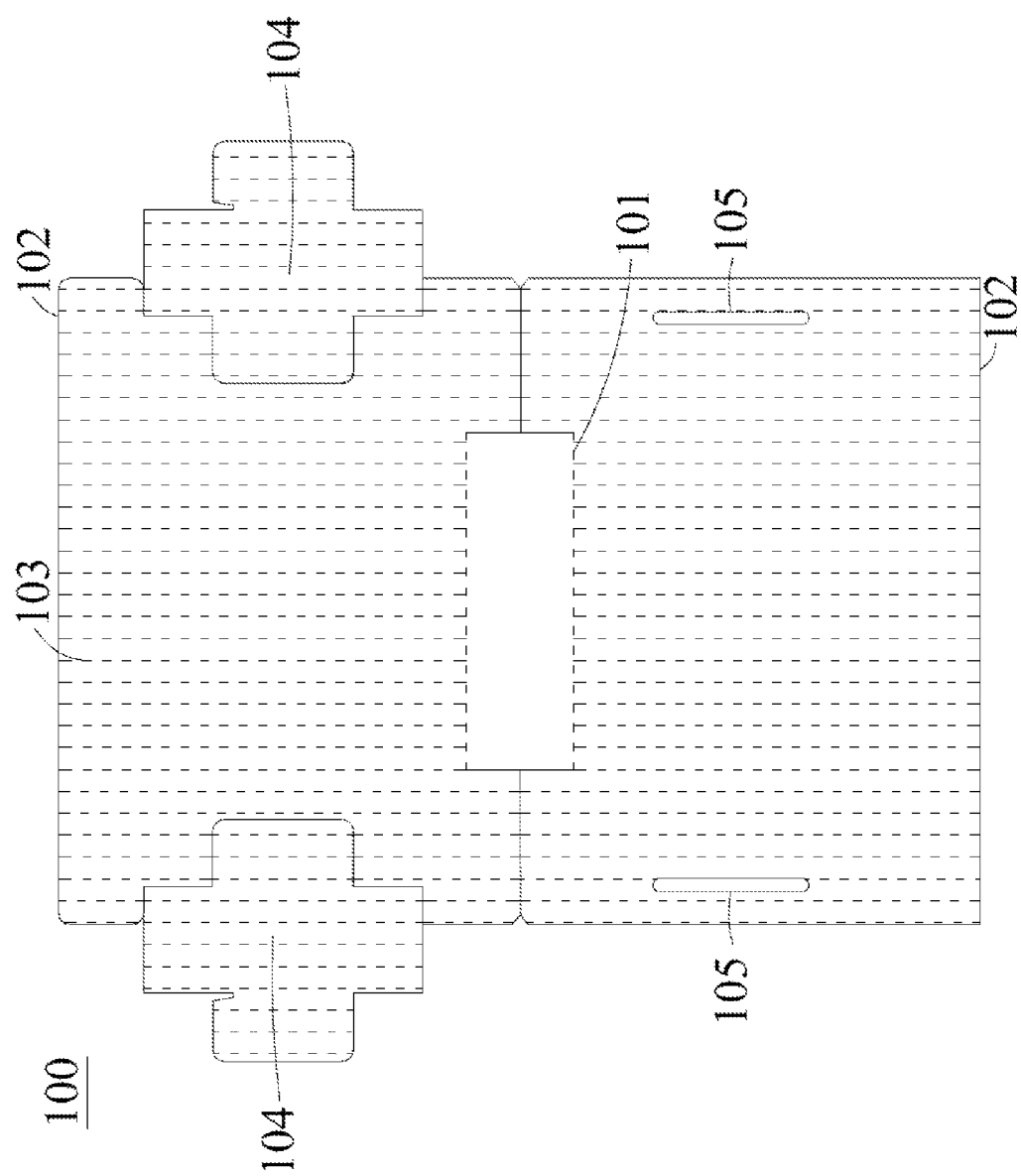
FIG. 1 is a plan view of a conventional packaging corrugated board.
Figure 2:
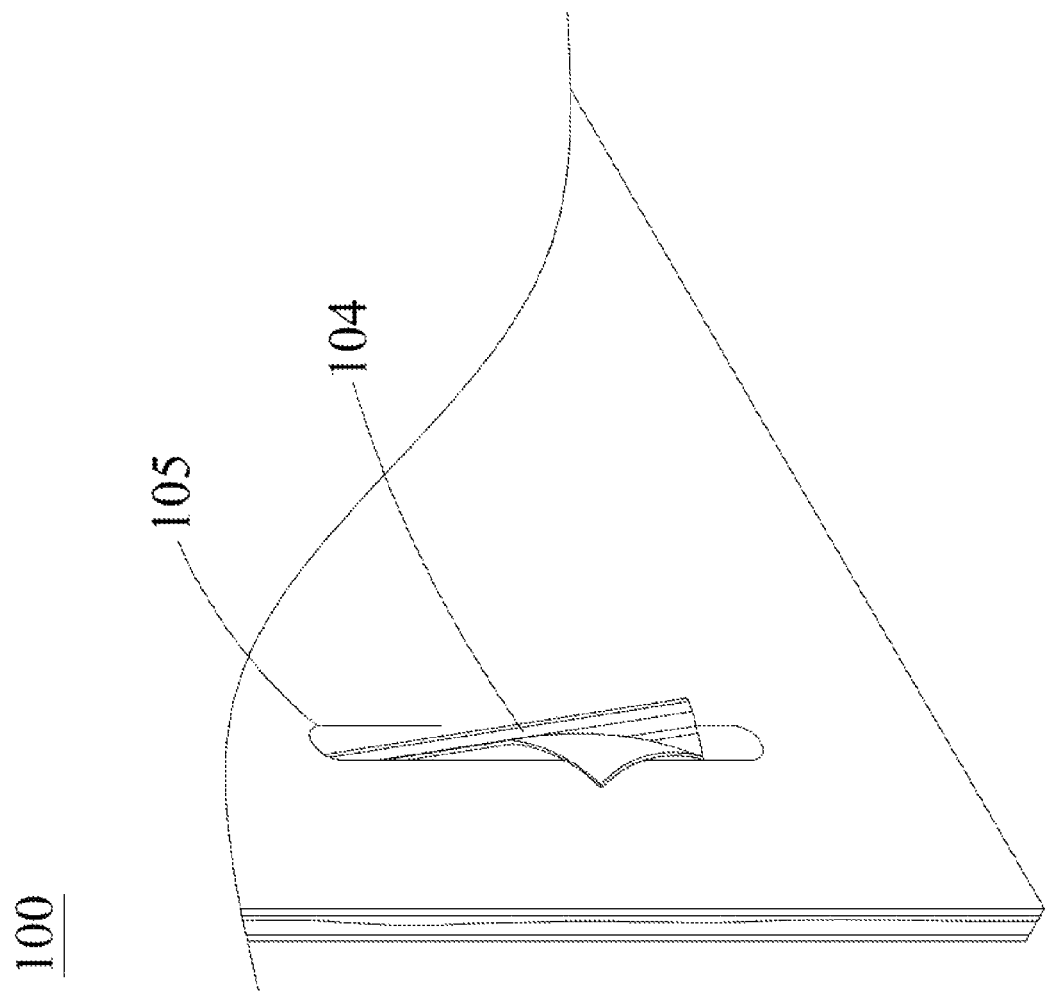
FIG. 2 is a perspective view showing an edge of the conventional packaging corrugated board of FIG. 1 parallel to a flute direction of the corrugated board tends to become damaged during use.

The present invention will now be described with some preferred embodiments thereof and with reference to the accompanying drawings. For the purpose of easy to understand, elements that are the same in the preferred embodiments are denoted by the same reference numerals.

Figure 3:
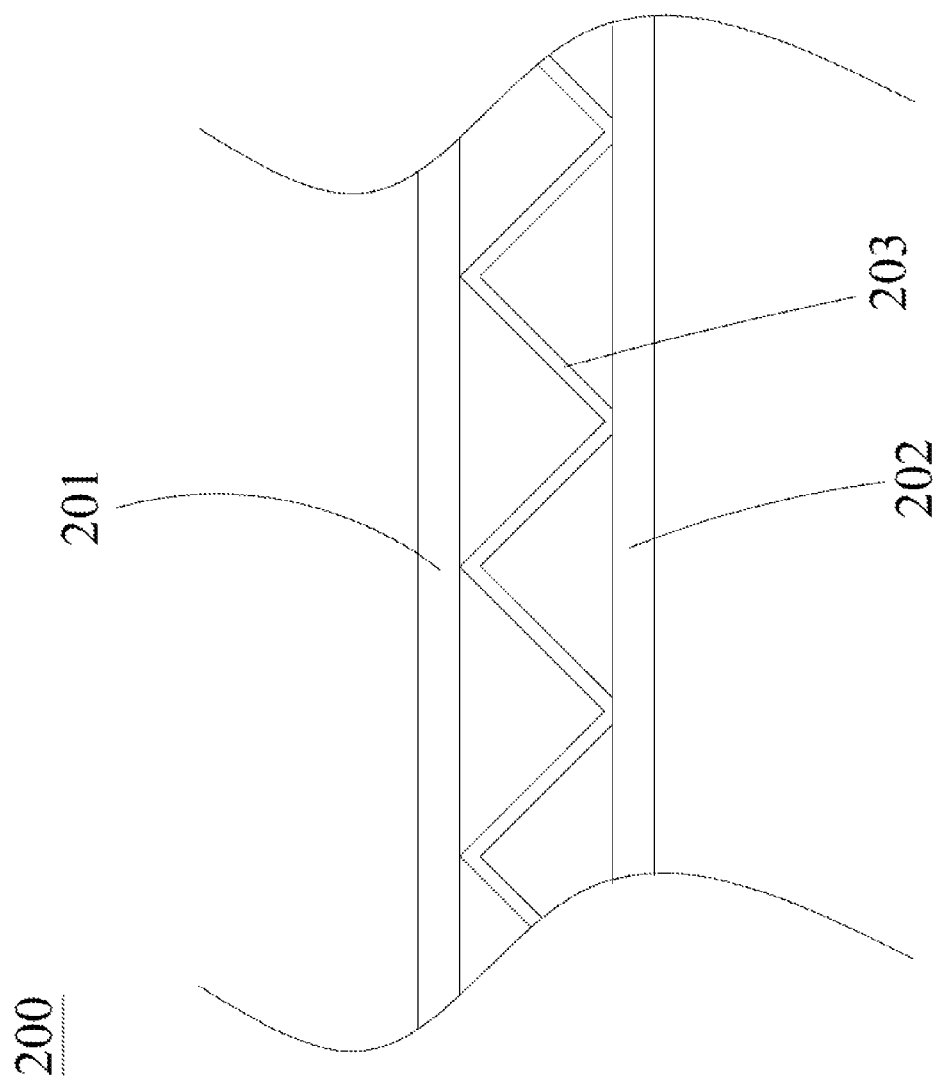
FIG. 3 is a sectional view showing the structure of a packaging corrugated board according to a first embodiment of the present invention.
Figure 4:
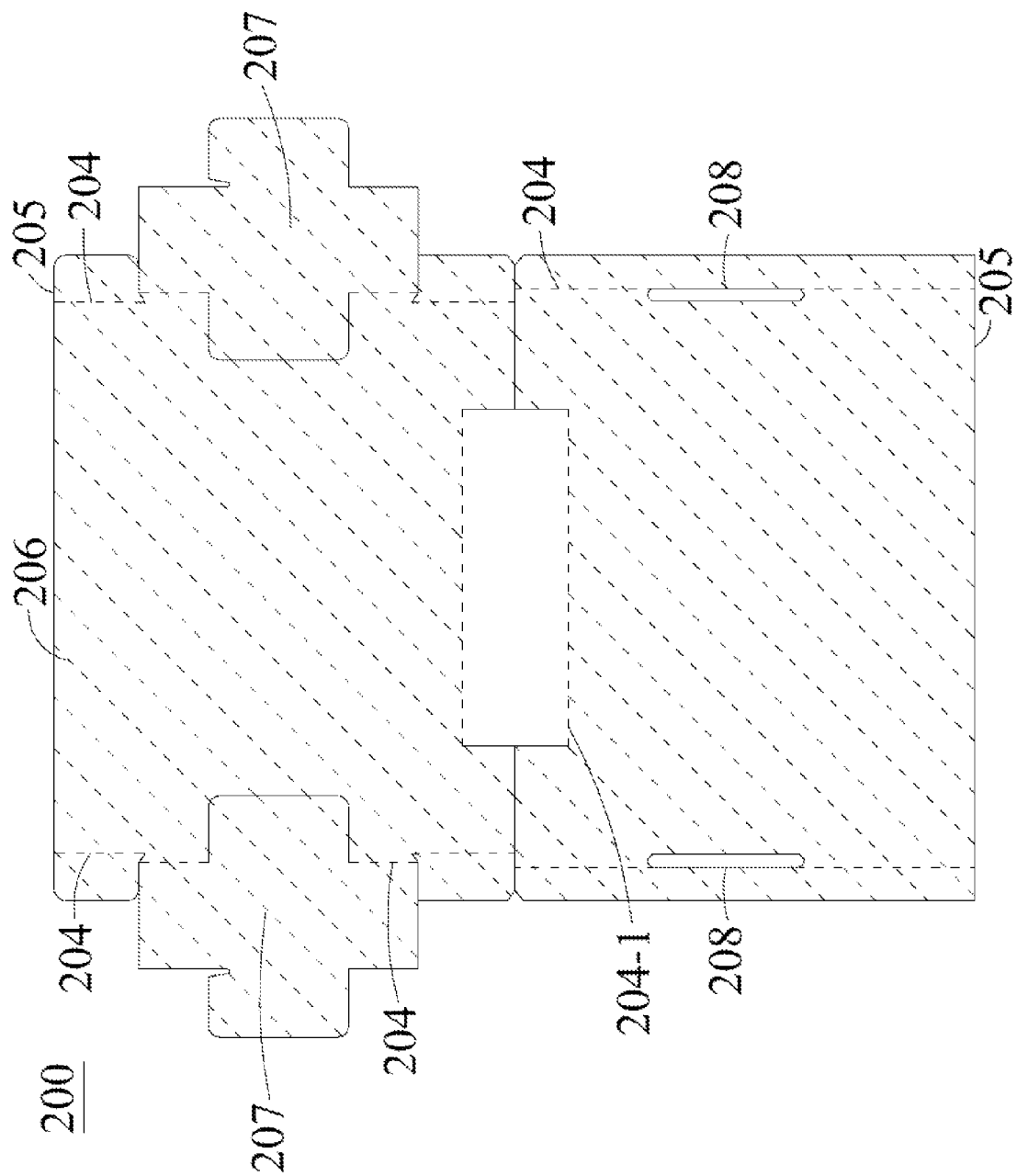
FIG. 4 is a plan view showing the packaging corrugated board according to the first embodiment of the present invention has peripheral edges oblique to a flute direction thereof.
Figure 5:
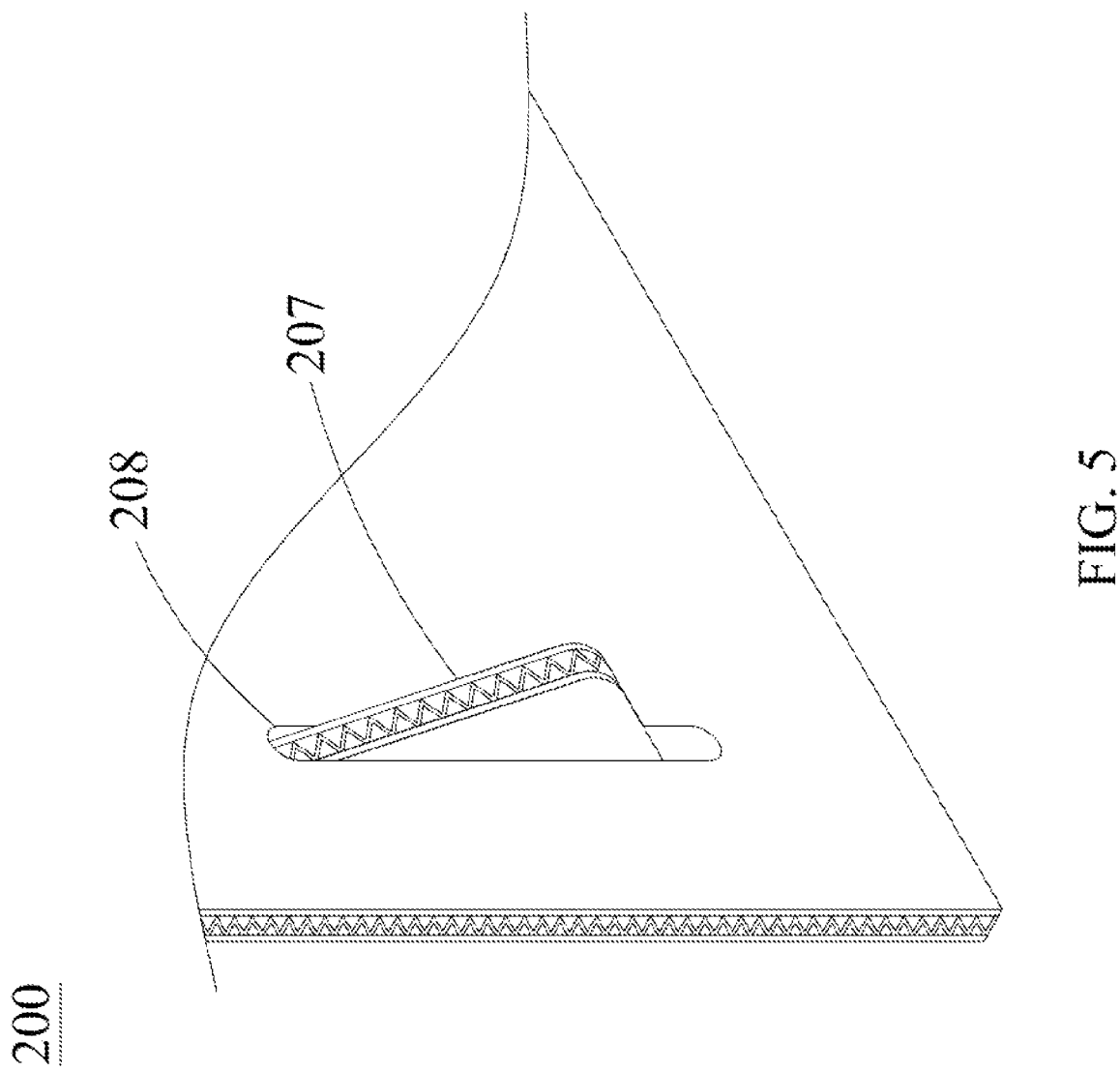
FIG. 5 is a perspective view showing an edge of the packaging corrugated board according to the first embodiment of the present invention is oblique to the flute direction and therefore not subjected to damage easily.

Please refer to FIGS. 3, 4 and 5 that show a packaging corrugated board according to a first embodiment of the present invention. As shown, a board body 200 of the packaging corrugated board in the first embodiment includes a first liner board 201, a second liner board 202, and a fluted medium 203 sandwiched between the first and the second flat liner 201, 202. The fluted medium 203 is a corrugated paper board having a plurality of flutes. The flutes may have a sine-wave, a square-wave, or a triangle-wave shaped cross section. Herein, a direction in which the flutes extend on the board body 200 is defined as a flute direction 206. The board body 200 has a plurality of score lines 204 formed thereon. A longest one of the score lines 204 is defined as a main score line 204-1. The board body 200 has a plurality of peripheral edges, a longest one of which is parallel to the main score line 204-1 and is defined as a main edge 205 herein. The board body 200 is provided at each of two lateral sides with an insertion board 207 and a slot 208. The board body 200 can be folded into a box by correspondingly inserting the insertion boards 207 into the slots 208.

In the first embodiment, the board body 200 is a packaging corrugated board being cut at 45 degrees. As can be seen from FIG. 4, on the board body 200 cut at 45 degrees, the main edge 205 and all other edges of the board body 200 are neither parallel nor perpendicular to the flute direction 206. Similarly, edges of the insertion boards 207 are neither parallel nor perpendicular to the flute direction 206. According to the present invention, an angle contained between the peripheral edges of the board body 200 and the flute direction 206 is preferably ranged between 15 and 75 degrees, more preferably between 30 and 60 degrees, and most preferably 45 degrees.

In the first embodiment, the board body 200 cut at 45 degrees has all peripheral edges neither parallel nor perpendicular to the flute direction 206. With this arrangement, the board body 200 may have a strengthened structure, such that portions of the first and the second liner board 201, 202 located at the peripheral edges of the board body 200 are not easily separable from the fluted medium 203 to become damaged. Particularly, even the liner boards at the edges of the insertion boards 207, which are frequently repeatedly detachably inserted into the slots 208, are not easily subjected to separation from the fluted medium, as shown in FIG. 5.

Figure 6:
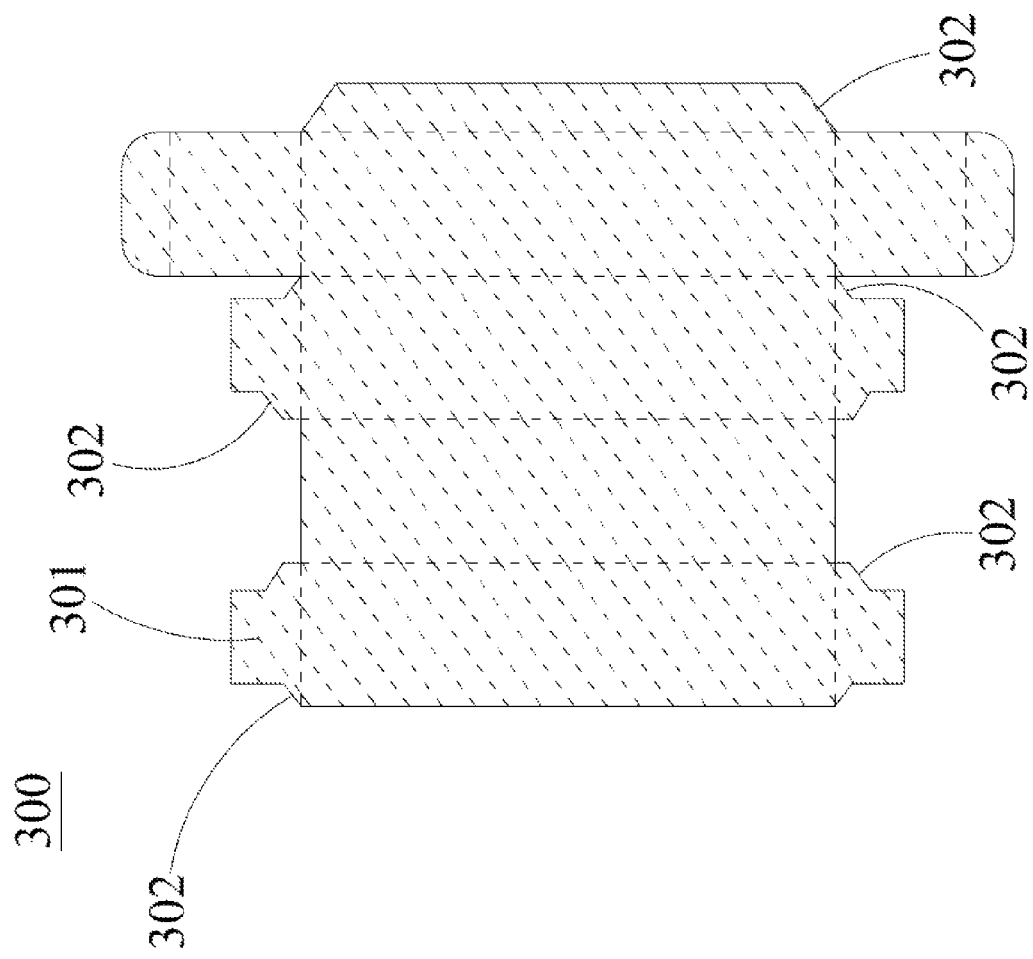
FIG. 6 is a plan view of a packaging corrugated board according to a second embodiment of the present invention.

Please refer to FIG. 6 that is a plan view of a packaging corrugated board 300 according to a second embodiment of the present invention. As shown, the packaging corrugated board 300 is formed by cutting at 45 degrees. As in the first embodiment, the packaging corrugated board 300 also includes a first liner board, a second liner board, and a fluted medium having a plurality of flutes and being sandwiched between the first and the second liner board. In the second embodiment, a direction in which the flutes of the fluted medium extend is defined as a flute direction 301. As can be seen from FIG. 6, most of the peripheral edges of the packaging corrugated board 300 cut at 45 degrees are neither parallel nor perpendicular to the flute direction 301, and only a few peripheral edges 302 of the packaging corrugated board 300 are parallel to the flute direction 301. Therefore, a total length of the peripheral edges of the packaging corrugated board 300 that are neither parallel nor perpendicular to the flute direction 301 is much larger than that of the peripheral edges being parallel to the flute direction 301. An angle contained between the flute direction 301 and the peripheral edges oblique to the flute direction is preferably ranged between 15 and 75 degrees, more preferably between 30 and 60 degrees, and most preferably 45 degrees.

In the second embodiment, while there are a few peripheral edges 302 of the packaging corrugated board 300 being parallel to the flute direction, all other peripheral edges are neither parallel nor perpendicular to the flute direction 301. Therefore, the packaging corrugated board 300 still has a strengthened structure and is not easily subjected to damage in use.

Figure 7A:
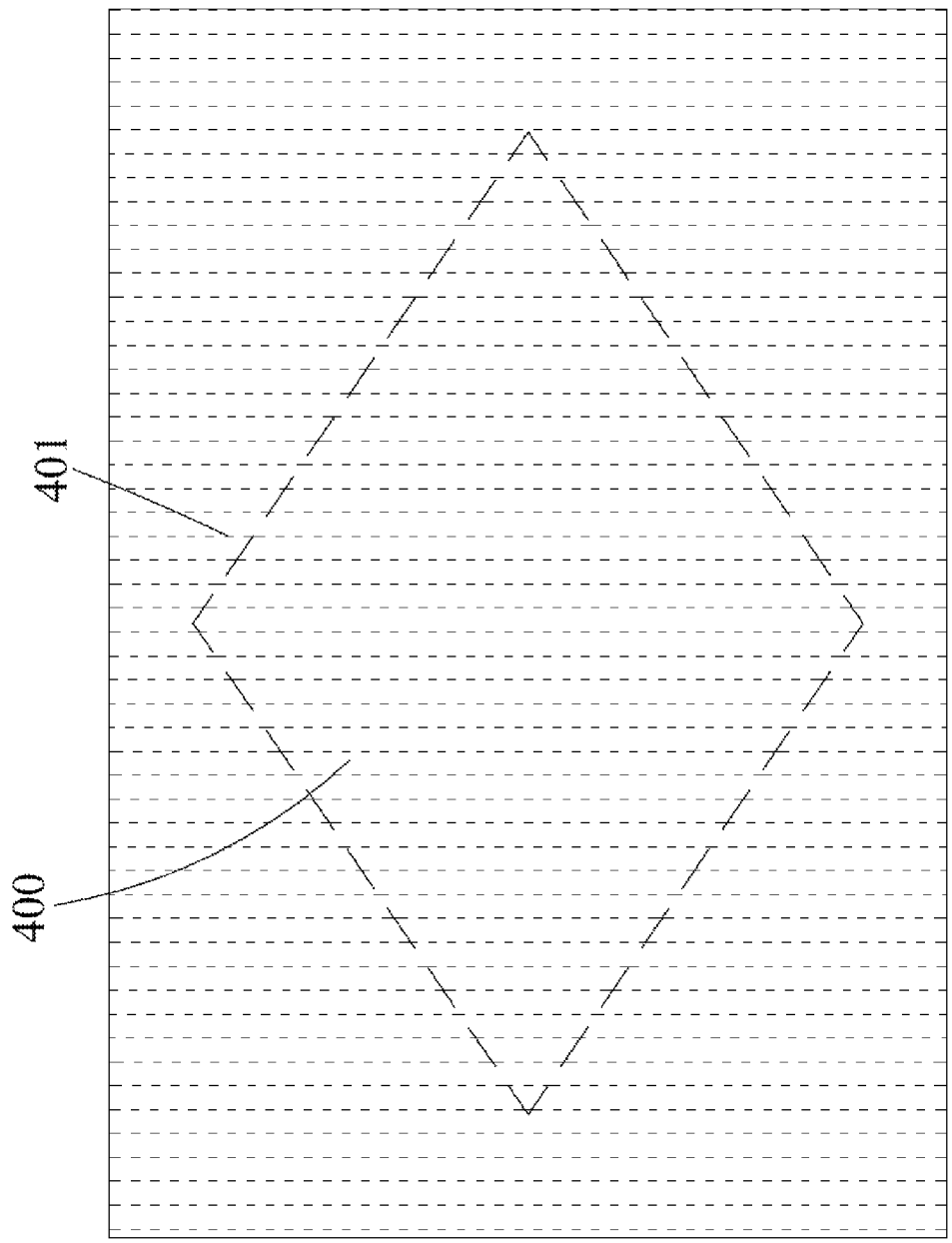
FIG. 7a is a plan view of a packaging corrugated board according to a third embodiment of the present invention before cutting.
Figure 7B:
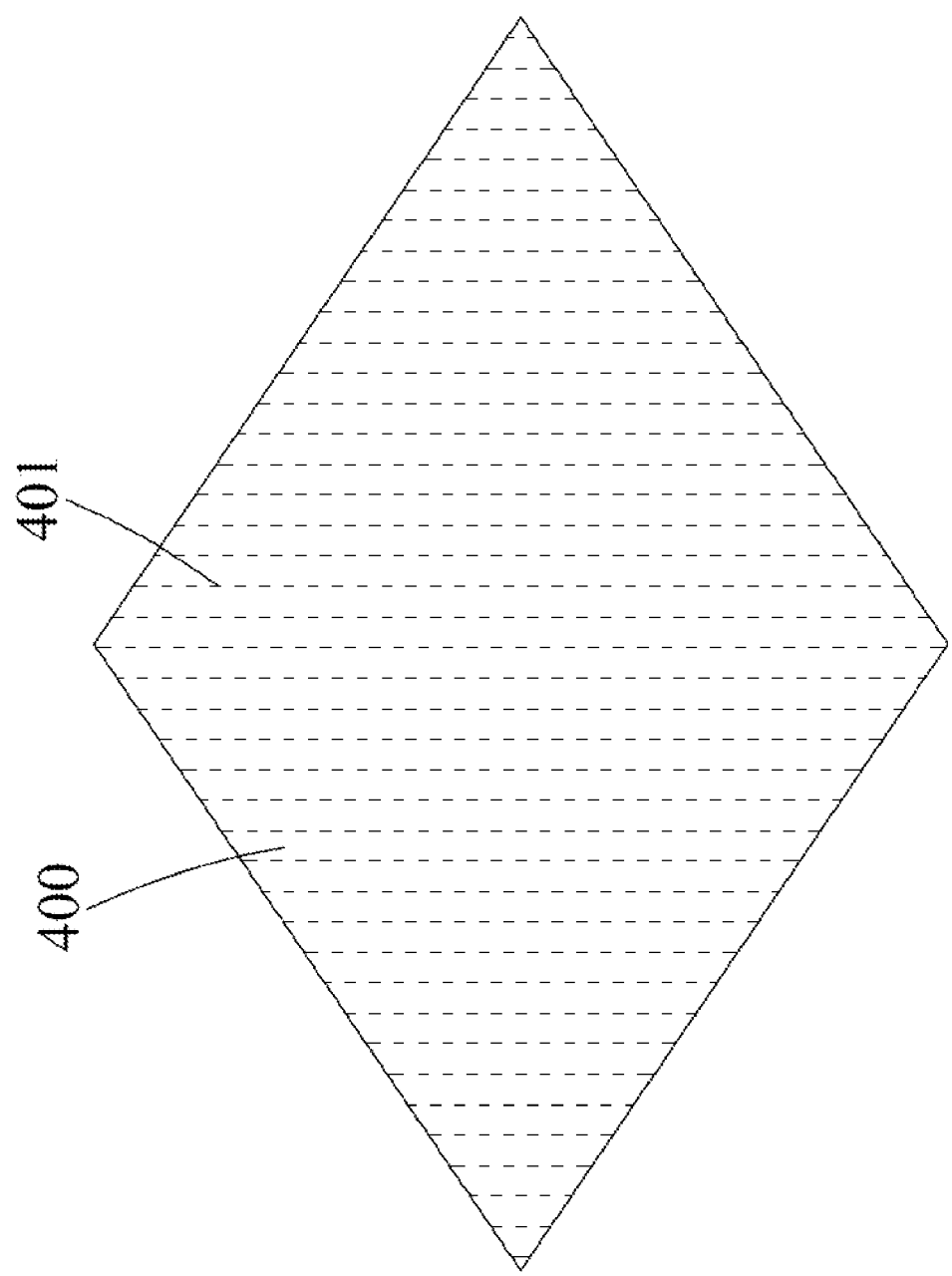
FIG. 7b shows the packaging corrugated board according to the third embodiment of the present invention after cutting.

FIGS. 7a and 7b respectively show a packaging corrugated board 400 according to a third embodiment of the present invention before and after cutting. In FIG. 7a, the packaging corrugated board 400 before cutting is shown by phantom lines. As can be seen from FIG. 7a, the packaging corrugated board 400 is cut out of a square-shaped initial corrugated board. The square-shaped initial corrugated board includes a fluted medium having a plurality of flutes, and a direction in which the flutes extend is defined as a flute direction 401 in the third embodiment. In FIG. 7a, the flute direction 401 is either parallel or perpendicular to the edges of the square-shaped initial corrugated board. However, unlike the packaging corrugated board being cut with conventional skill and therefore having edges parallel or perpendicular to the flute direction 401, the packaging corrugated board 400 according to the present invention is cut out of the square-shaped initial corrugated board at 45 degrees relative to the flute direction 401.

FIG. 7b shows the packaging corrugated board 400 after cutting. As shown, the packaging corrugated board 400 is cut at 45 degrees relative to the flute direction 401, so that all peripheral edges of the packaging corrugated board 400 are neither parallel nor perpendicular to the flute direction 401. By cutting the initial corrugated board in this manner, the obtained packaging corrugated board 400 can have a strengthened structure, so that portions of the liner boards thereof located at peripheral edges or corners of the packaging corrugated board 400 are not easily separable from the fluted medium and become damaged, even if the package corrugated board 400 has been used over a long time.

In conclusion, the present invention breaks through the conventional knowledge about cutting a corrugated board and cuts the corrugated board at 45 degrees relative to the flute direction, so that the peripheral edges and corners of the obtained packaging corrugated board are not easily separable from the fluted medium to become damaged. The packaging corrugated board cut at 45 degrees according to the present invention is particularly advantageous for use when the packaging corrugated board includes slots and insertion boards that are to be frequently detachably inserted into the slots.

The present invention has been described with some preferred embodiments thereof and it is understood that many changes and modifications in the described embodiments can be carried out without departing from the scope and the spirit of the invention that is intended to be limited only by the appended claims.

What is claimed is:

1. A packaging corrugated board having peripheral edges oblique to flute direction thereof, comprising a board body, the board body comprising a plurality of insertion boards and a plurality of slots corresponding to the insertion boards, the board body being formed of a first liner board, a second liner board, and a fluted medium sandwiched between the first and the second liner board; the fluted medium being a corrugated board having a plurality of flutes, and a direction in which the flutes extend being defined as a flute direction; the board body defining a plurality of peripheral edges, and at least a large part of the peripheral edges being neither parallel nor perpendicular to the flute direction; wherein a total length of the peripheral edges that are neither parallel nor perpendicular to the flute direction is larger than that of the peripheral edges that are parallel or perpendicular to the flute direction, such that peripheral edges of the insertion boards are neither parallel nor perpendicular to the flute direction to prevent from damaging the peripheral edges and corners of the insertion boards when the insertion boards are repeatedly and detachably inserted into the slots correspondingly provided on the board body.

2. The packaging corrugated board as claimed in claim 1, wherein a total number of the peripheral edges being neither parallel nor perpendicular to the flute direction is much larger than that of the peripheral edges being parallel or perpendicular to the flute direction.

3. The packaging corrugated board as claimed in claim 1, wherein all the peripheral edges of the board body are neither parallel nor perpendicular to the flute direction.

4. The packaging corrugated board as claimed in claim 3, wherein an angle contained between the peripheral edges and the flute direction is 45 degrees.

5. The packaging corrugated board as claimed in claim 1, wherein an angle contained between the flute direction and the peripheral edges that are neither parallel nor perpendicular to the flute direction is ranged between 15 and 75 degrees.

6. The packaging corrugated board as claimed in claim 5, wherein the angle contained between the flute direction and the peripheral edges that are neither parallel nor perpendicular to the flute direction is ranged between 25 and 65 degrees.

7. The packaging corrugated board as claimed in claim 6, wherein the angle contained between the flute direction and the peripheral edges that are neither parallel nor perpendicular to the flute direction is ranged between 35 and 55 degrees.

8. The packaging corrugated board as claimed in claim 7, wherein the angle contained between the flute direction and the peripheral edges that are neither parallel nor perpendicular to the flute direction is 45 degrees.

9. The packaging corrugated board as claimed in claim 1, wherein the board body further includes a plurality of score lines, and one of the score lines that has a length, width or height larger than that of any other score lines is defined as a main score line; and any one of the peripheral edges of the board body that is parallel to the main score line is neither parallel nor perpendicular to the flute direction.

10. The packaging corrugated board as claimed in claim 1, wherein the flutes have a cross sectional shape selected from the group consisting of a sine-wave shape, a square-wave shape, and a triangle-wave shape.

* * * * *